US010373521B2

(12) United States Patent
Franklin

(10) Patent No.: US 10,373,521 B2
(45) Date of Patent: Aug. 6, 2019

(54) SPORT TRAINING APPARATUS

(71) Applicant: Richard James Allen Franklin, Coventry (GB)

(72) Inventor: Richard James Allen Franklin, Coventry (GB)

(*) Notice: Subject to any disclaimer, the term of this patent is extended or adjusted under 35 U.S.C. 154(b) by 505 days.

(21) Appl. No.: 15/033,277

(22) PCT Filed: Oct. 30, 2014

(86) PCT No.: PCT/GB2014/053239
§ 371 (c)(1),
(2) Date: Apr. 29, 2016

(87) PCT Pub. No.: WO2015/063499
PCT Pub. Date: May 7, 2015

(65) Prior Publication Data
US 2016/0275815 A1 Sep. 22, 2016

(30) Foreign Application Priority Data

Oct. 30, 2013 (GB) .................................. 1319181.2

(51) Int. Cl.
*G09B 19/00* (2006.01)
*A63B 24/00* (2006.01)
(Continued)

(52) U.S. Cl.
CPC ...... *G09B 19/0038* (2013.01); *A63B 24/0062* (2013.01); *A63B 24/0087* (2013.01);
(Continued)

(58) Field of Classification Search
CPC .. G09B 19/0038; G09B 5/02; A63B 24/0062; A63B 24/0087; A63B 69/002;
(Continued)

(56) References Cited

U.S. PATENT DOCUMENTS 4,353,545 A * 10/1982 Anderson .......... A63B 69/0053
273/440
4,607,842 A 8/1986 Daouast
(Continued)

FOREIGN PATENT DOCUMENTS

CA 1203258 4/1986
GB 2332630 6/1999
(Continued)

OTHER PUBLICATIONS

GB Search Report from UK Intellectual Property Office in GB1319181 dated Mar. 5, 2015.
(Continued)

*Primary Examiner* — Robert P Bullington
(74) *Attorney, Agent, or Firm* — Keusey & Associates, P.C.

(57) ABSTRACT

Sport training apparatus (10) for improving the speed and skill of a user such as a footballer includes a plurality of target assemblies (12), each target assembly (12) including at least one target (14). Each target (14) includes a target member (16), an alert device (17) and a sensor (20). The apparatus (10) includes a controller (22) in signal communication with each alert device (17) and each sensor (20), the controller (22) including a sequencer (24) which controls the sequence in which the alert devices (17) are activated. The apparatus (10) is arranged so that in use, one alert device (17) is activated until the respective sensor (20) detects that the respective target member (16) has been hit, whereupon the sequencer (24) will deactivate the one alert device (17) and activate another alert device (17).

21 Claims, 5 Drawing Sheets

(51) Int. Cl.
*A63B 69/00* (2006.01)
*G09B 5/02* (2006.01)

(52) U.S. Cl.
CPC ........ *A63B 69/002* (2013.01); *A63B 69/0053* (2013.01); *A63B 69/0091* (2013.01); *G09B 5/02* (2013.01); *A63B 2024/004* (2013.01); *A63B 2207/02* (2013.01)

(58) Field of Classification Search
CPC ............ A63B 69/0053; A63B 69/0091; A63B 2024/004; A63B 2207/02
USPC ........................................................ 434/251
See application file for complete search history.

(56) References Cited

U.S. PATENT DOCUMENTS

| | | | |
|---|---|---|---|
| 5,221,243 A | 6/1993 | Walker | |
| 5,435,572 A | 7/1995 | Covel | |
| 5,469,740 A | 11/1995 | French et al. | |
| 2002/0042312 A1 | 4/2002 | Decloux | |
| 2007/0184920 A1 | 8/2007 | Mah | |
| 2007/0191141 A1 | 8/2007 | Weber | |
| 2008/0051228 A1* | 2/2008 | Harmon | A63B 69/0053 473/445 |
| 2013/0012339 A1 | 1/2013 | Rockoff | |
| 2013/0303312 A1* | 11/2013 | DeBolt | A63B 69/00 473/446 |

FOREIGN PATENT DOCUMENTS

| | | |
|---|---|---|
| GB | 2380948 | 4/2003 |
| WO | 2012162505 | 11/2012 |
| WO | 2013/071408 | 5/2013 |

OTHER PUBLICATIONS

International Search Report from European Patent Office in PCT/GB2014/053239 dated Feb. 17, 2015.

* cited by examiner

SPORT TRAINING APPARATUS

BACKGROUND OF THE INVENTION

1. Field of the Invention

The present invention relates to sport training apparatus, particularly but not exclusively sport training apparatus for improving the foot speed and skill of a football player.

2. The Prior Art

Conventionally, training for football players is either team based, involving a plurality of players undergoing exercise and developing and practicing skills together, or individual, in which an individual develops ball skills or undergoes exercise on his/her own. One problem with individual skill development is that it can be difficult to provide a consistent and repeatable regime which permits skill level and development to be measured and compared. Another problem is that the individual training aids and methods available do not reflect real game situations. For example the well-known training exercise of simply keeping a ball in the air without the ball touching the ground by using feet, upper legs, head and chest, develops ball control skills, but is predictable in terms of where the ball will be, so does not exercise or develop such skills as reaction time, ball awareness, agility or foot speed.

In this specification, the term "football" is used to denote the game of association football or soccer.

SUMMARY OF THE INVENTION

According to a first aspect of the present invention there is provided sport training apparatus for improving speed and skill of a user, the apparatus including a plurality of target assemblies, each target assembly including at least one target, each target including a target member, an alert device and a sensor, the apparatus including a controller in signal communication with each alert device and each sensor, the controller including a sequencer which controls the sequence in which the alert devices are activated, the apparatus being arranged so that in use, one alert device is activated until the respective sensor detects that the respective target member has been hit, whereupon the sequencer will deactivate the one alert device and activate another alert device.

Possibly, each target assembly is substantially spherical, and each target assembly may be approximately the size of a standard football.

Possibly, each target assembly includes at least two targets, which may be arranged side by side horizontally. Each target may comprise a target member, which may be substantially hemispherical, and may substantially form a hemisphere of the target assembly. Possibly, each target member is formed of a resiliently deformable material, such as a high density foam plastics material or a foam rubber.

Possibly, the target assemblies are arranged in one or more rows, and may be equispaced along the rows. The or each row may be in the form of an arc. Possibly, the or each arc is centred on a centre point. Possibly, the or each centre point lies along a centre point axis, which may be substantially vertical.

Possibly, in use, a user may be positioned at or near the centrepoint axis.

Possibly, the apparatus includes a plurality of rows, each of which is at a different height from the ground or floor. Possibly, each of the rows is located at a different distance from the centre point axis. Possibly, the rows are equispaced vertically, and may be equispaced horizontally. Possibly, as each higher row is further from the centre point axis than the adjacent row below.

Possibly, the target assemblies in each row are offset in position from the target assemblies in the or both adjacent rows and may be offset equally from the target assemblies in the or both adjacent rows.

Possibly, each target assembly is mounted to a mounting. Possibly, each mounting mounts a plurality of target assemblies, which may be in different rows. Possibly, each mounting comprises a mounting member, which may slope upwardly away from the centre point axis, and possibly the direction of slope may in plan lie along a radial to the centre point axis.

Possibly, each alert device includes an indicator light, which is illuminated when activated.

Possibly, the controller includes a timer, and the apparatus may include an exercise duration time input. The sequencer may operate for the exercise duration time.

Possibly, the controller includes a counter, which may count the number of target members hit during an exercise session. The apparatus may include a number input, which may permit the user to input the number of targets to be successively illuminated during the exercise session. The sequencer may operate until the counter reaches the number input.

Possibly, the controller includes a random target generator, which generates the next target to be illuminated on a random basis.

Possibly, the sequencer is programmable, to permit the user to input a predetermined sequence of targets.

Possibly, each mounting includes an actuator for moving the respective target assembly. Possibly, the actuator comprises the alert device. Possibly, each target assembly is moved substantially horizontally.

Possibly, the apparatus includes a wall. Possibly, the wall defines a plurality of openings, in each of which, one of the target assemblies may be located in a retracted condition.

Possibly, each target assembly is moveable by the respective actuator between the retracted condition, in which the respective target assembly is located in the opening, and an extended condition, in which the respective target assembly is located out of the opening.

Possibly, the apparatus is for improving the foot speed and skill of a footballer. Possibly, the apparatus is football training apparatus.

According to a second aspect of the present invention, there is provided a method of sport training for improving speed and skill of a user, the method including providing sport training apparatus, the apparatus including a plurality of target assemblies, each target assembly including at least one target, each target including a target member, an alert device and a sensor, the apparatus including a controller in signal communication with each alert device and each sensor, the controller including a sequencer which controls the sequence in which the alert devices are activated, the apparatus being arranged so that in use, one alert device is activated until the respective sensor detects that the respective target member has been hit, whereupon the sequencer will deactivate the one alert device and activate another alert device.

Possibly, the method and apparatus includes any of the steps or features described in any of the preceding statements.

BRIEF DESCRIPTION OF THE DRAWINGS

An embodiment of the present invention will now be described, by way of example only, and with reference to the accompanying drawings, in which:—

DETAILED DESCRIPTION OF THE PREFERRED EMBODIMENT

Figure 1:
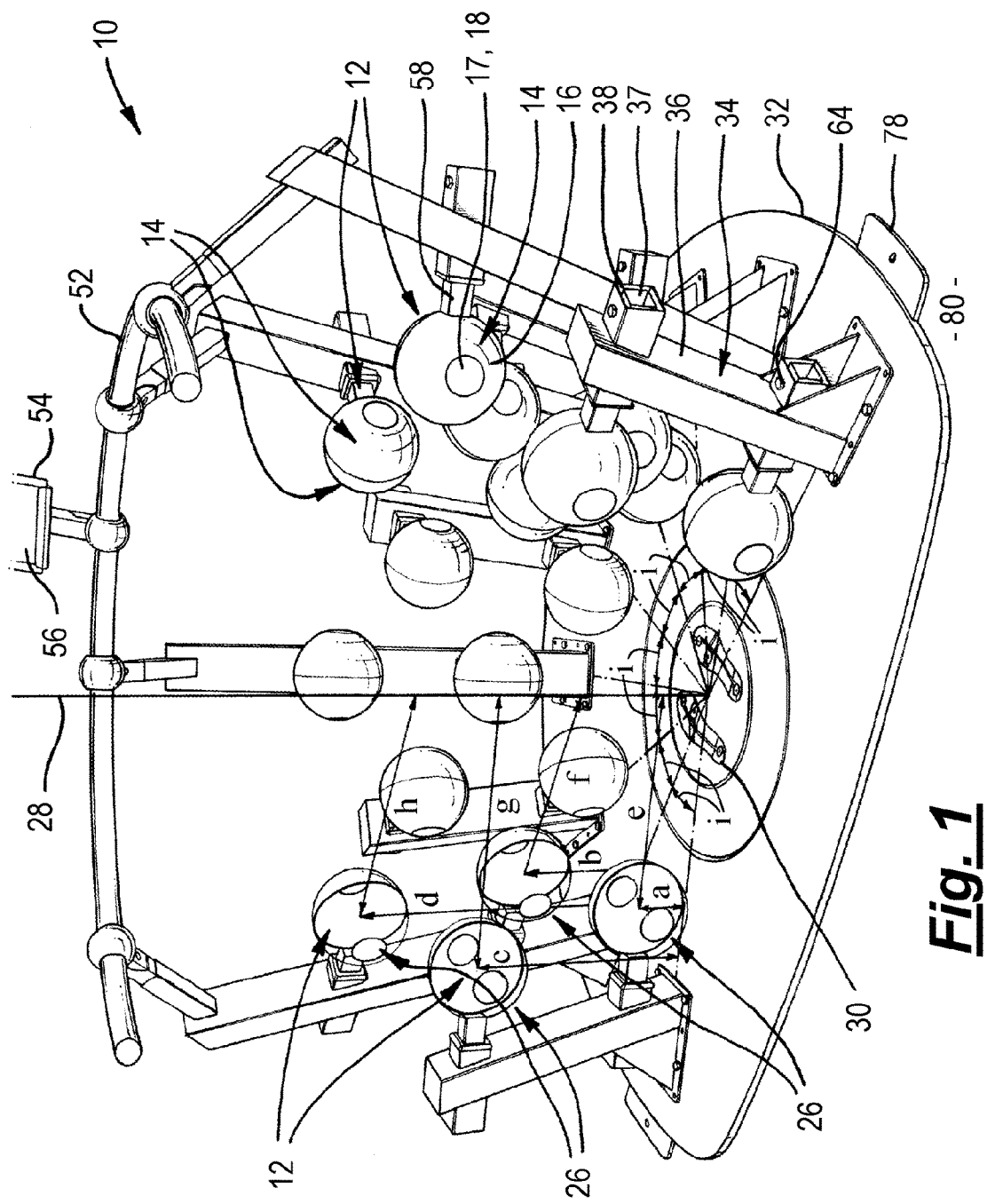
FIG. 1 is a perspective view of a sport training apparatus.
Figure 2:
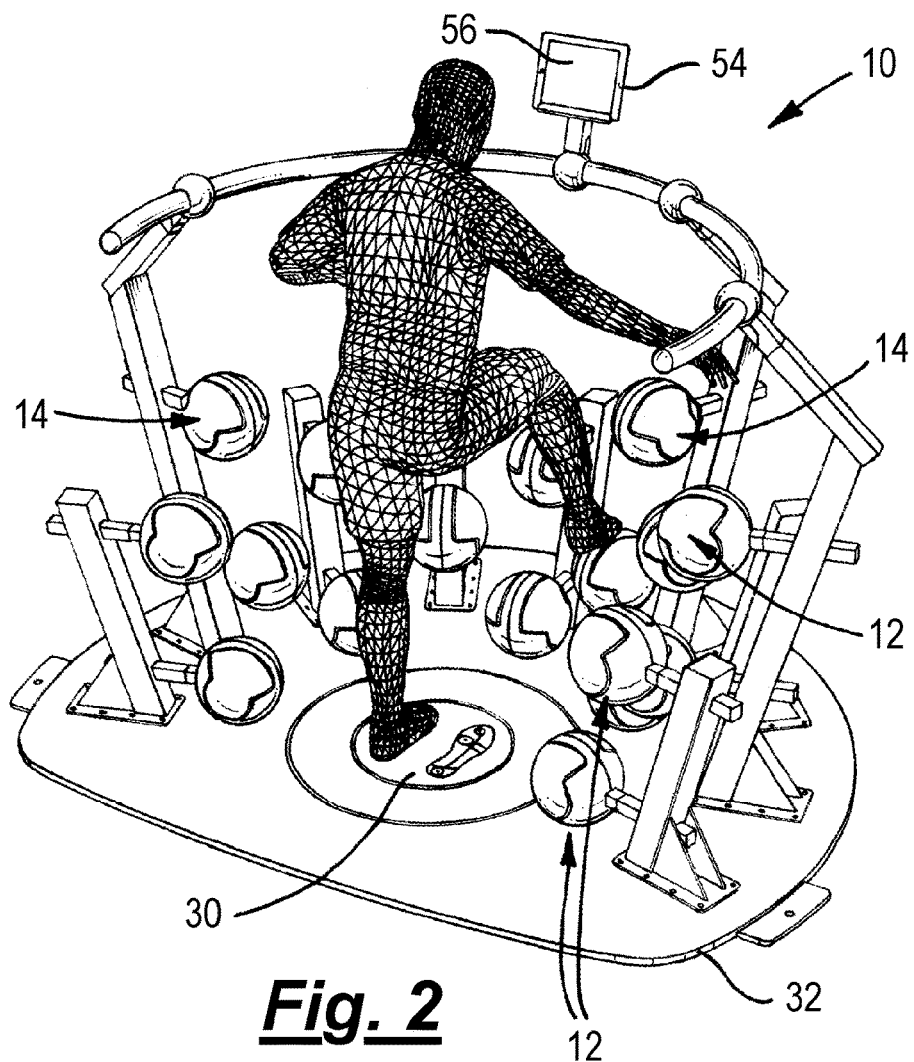
FIG. 2 is a perspective view of the apparatus of FIG. 1 in use.

FIGS. 1 to 5 show football training apparatus 10 for improving the foot speed and skill of a footballer. The apparatus 10 includes a plurality of target assemblies 12, each target assembly 12 including at least one target 14. Each target 14 includes a target member 16, an alert device 17 and a sensor 20. The apparatus 10 includes a controller 22 in signal communication with each alert device 17 and each sensor 20, the controller 22 including a sequencer 24 which controls the sequence in which the alert devices 17 are activated. The apparatus 10 is arranged so that in use, one alert device 17 is activated until the respective sensor 20 detects that the respective target member 16 has been hit, whereupon the sequencer 24 will deactivate the one alert device 17 and activate another alert device 17.

As shown in the figures, in the example shown, each target assembly 12 is substantially spherical, and could be approximately the size of a standard football. In one example, each target assembly 12 could be similar or identical in size to a standard size 5 football with a circumference of 68-70 cm (FIFA regulation) and therefore a diameter of 215 to 225 mm.

Each target assembly 12 includes two targets 14, which are arranged side by side horizontally. Each target 14 comprises a substantially hemispherical target member 16 which substantially forms a hemisphere of the target assembly 12. Each target member 16 is formed of a resiliently deformable material, such as a foam plastics material or a foam rubber. The material should have a similar pneumatic feel to a standard football.

In the example shown, the target assemblies 12 are arranged in four rows 26, each of which is at a different height from ground or floor 80, the target assemblies 12 being equispaced along the rows 26. Each row 26 is the form of an arc centred on a centre point. In the example shown, each centre point lies along a substantially vertical centre point axis 28. Each of the rows 26 is located at a different distance from the centre point axis 28. The rows 26 are equispaced vertically and horizontally, with each higher row 26 being further from the centre point axis 28 than the adjacent row 26 below.

The target assemblies 12 in each row 26 are offset equally in position from the target assemblies 12 in the or both adjacent rows.

Each target assembly 12 is mounted to a mounting 34. Each mounting 34 mounts a plurality of target assemblies 12, which lie in different rows 26. Each mounting 34 comprises a mounting member 36, which slopes upwardly away from the centre point axis. The direction of slope in plan lies along a radial to the centre point axis 28.

In the example shown, each alert device 17 comprises an indicator light 18, which is illuminated when activated.

The apparatus 10 includes a base member 32 on which the mountings 34 are mounted. The base member 32 is in the form of a plate and includes fixings 78 for fixing the base member 32 to the ground or floor 80.

The base member 32 includes a user location marking 30 for marking where a user should stand when using the apparatus 10. The user location marking 30 is substantially centred on the centerpoint axis 28.

In FIG. 1, dimensions and angles of the target assemblies 12 relative to the base member 32 and the centerpoint axis 28 are shown, designated by arrows a, b, c, d, e, f, g, h, and i. In one example, these dimensions and angles could be as follows:

a 115 mm (+/−10 mm)—the height of the lowest row 26 of the five target assemblies 12 above the base member 32.

b 305 mm (+/−10 mm)—the height of the four target assemblies 12 on the second row 26 above the base member 32.

c 495 mm (+/−10 mm)—the height of the five target assemblies 12 on the third row 26 above the base member 32.

d 685 mm (+/−10 mm)—the height of the four target assemblies 12 on the highest row 26 above the base member 32.

e 500 mm (+/−40 mm)—the distance between the target assembly 12 and the centre point axis 28 for each of the five target assemblies 12 on the lowest row 26.

f 560 mm (+/−40 mm)—the distance between the target assembly 12 and the centre point axis 28 for each of the four target assemblies 12 on the second row 26.

g 620 mm (+/−40 mm)—the distance between the target assembly 12 and the centre point axis 28 for each of the five target assemblies 12 on the third row 26.

h 680 mm (+/−40 mm)—the distance between the target assembly 12 and the centre point axis 28 for each of the four target assemblies 12 on the highest row 26.

i 26.5° (+/−1°)—the angle between the target assemblies 12 mounted on adjacent mounting members 36, relative to the centerpoint axis 28. Thus, the angle between the target assemblies 12 in the same row is 53° (+/−2°).

All dimensions are taken from the centre of the target assemblies 12.

From the angle i, the maximum angle occupied by the target assemblies 12 (ie by the target assemblies 12 on the lowest and the third row) is 8×26.5° (+/−1°) ie) 212° (±8°.

The applicant has found that the above dimensions provide an optimum ergonomic arrangement.

Figure 3:
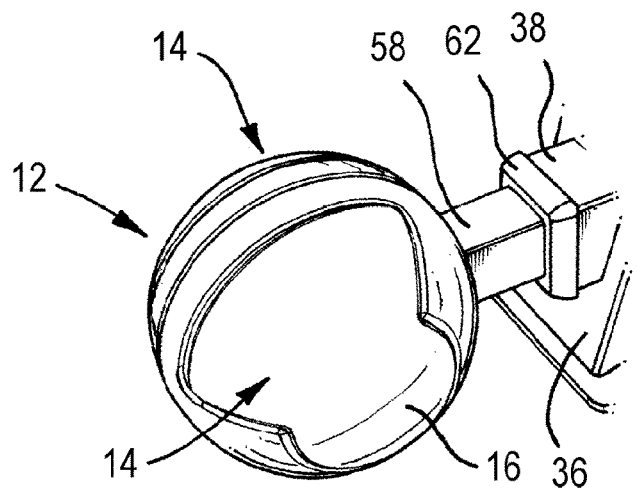
FIG. 3 is a perspective view of a target assembly of the sport training apparatus of FIG. 1.
Figure 4:
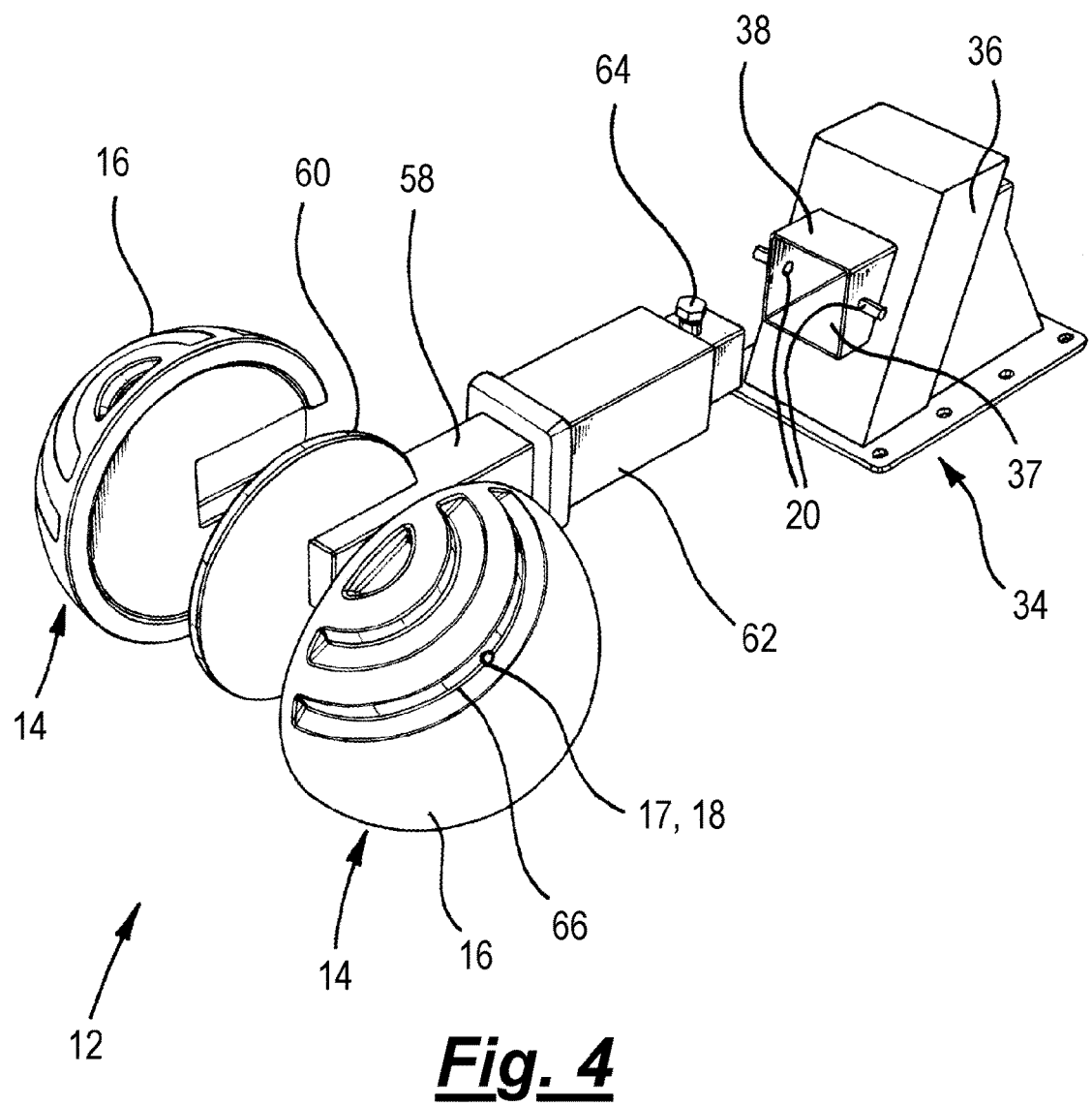
FIG. 4 is an exploded perspective view of the target assembly.

As shown particularly in FIGS. 3 and 4, each mounting 34 includes a target arm member 58 which includes a target support core 60 at one end. The target support core 60, which in one example (as shown) could be in the form of a disc, is located between and supports the two hemispherical target members 16.

Each mounting member 36 includes an arm socket member 38 which defines an arm socket 37 in which the other end of the target arm member 58 locates. Each mounting 34 includes a suspension mounting sleeve 62 which locates around the target arm member 58, between the target arm member 58 and the arm socket member 38 in the arm socket 37.

The suspension mounting sleeve 62 is formed of a resiliently deformable material, such as a plastics material or rubber, to permit a degree of relative movement of the target arm member 58 within the arm socket 37. The degree of relative movement of the respective target assembly 12 could be of the order of ±10 mm.

Each mounting 34 includes a suspension pivot member 64 which locates substantially vertically through apertures (not shown) defined by the target arm member 58 and the arm socket member 38 on the outer side of the mounting member 36, away from the target assembly 12. The vertical suspension pivot member 64 substantially permits only horizontal relative movement of the target member 58 within the arm socket 37. The suspension pivot member 64 could be, for example, a bolt and nut.

The apparatus 10 includes a rail member 52 which is mounted to some of the mounting members 36 to provide a grab rail for the user in use.

As shown in FIG. 4, the sensors 20 of the targets 14 could be mounted to an inner part of the arm socket member 38. Alternatively, the sensors 20 could be mounted to the target support core 60 or within the target members 16. The sensors 20 could be of any suitable type. For example, the sensors 20 could be strain sensors, which could measure force or pressure; contact sensors, in which one contact is physically moved against another; or proximity sensors which detect a change in a field.

The alert devices 17 could be of any suitable type, and could be located in any suitable location. For example, each alert device 17 could comprise several indicator lights and/or one or more other visual switchable devices and/or an audible alert the or each indicator light 18 could be an LED.

Each indicator light 18 could be located, as shown in FIG. 4, in a pocket or channel 66 defined by the target member 16, which protects the indicator light 18 from damage during use. Alternatively, the indicator lights 18 could be mounted separately to the target members 16, but adjacent or in the vicinity of the target members 16. In the figures, the target members are shown with different surface appearances in FIGS. 1 to 4. This is simply cosmetic surface differences. In practice the surface of each target assembly 12 could be encased in a skin of a resiliently deformable material such as PVC.

The apparatus 10 includes a computer 54 which comprises the controller 22 and a display screen 56, which could be a touch sensitive screen. The computer 54 is mounted to the rail member 52.

Figure 5:
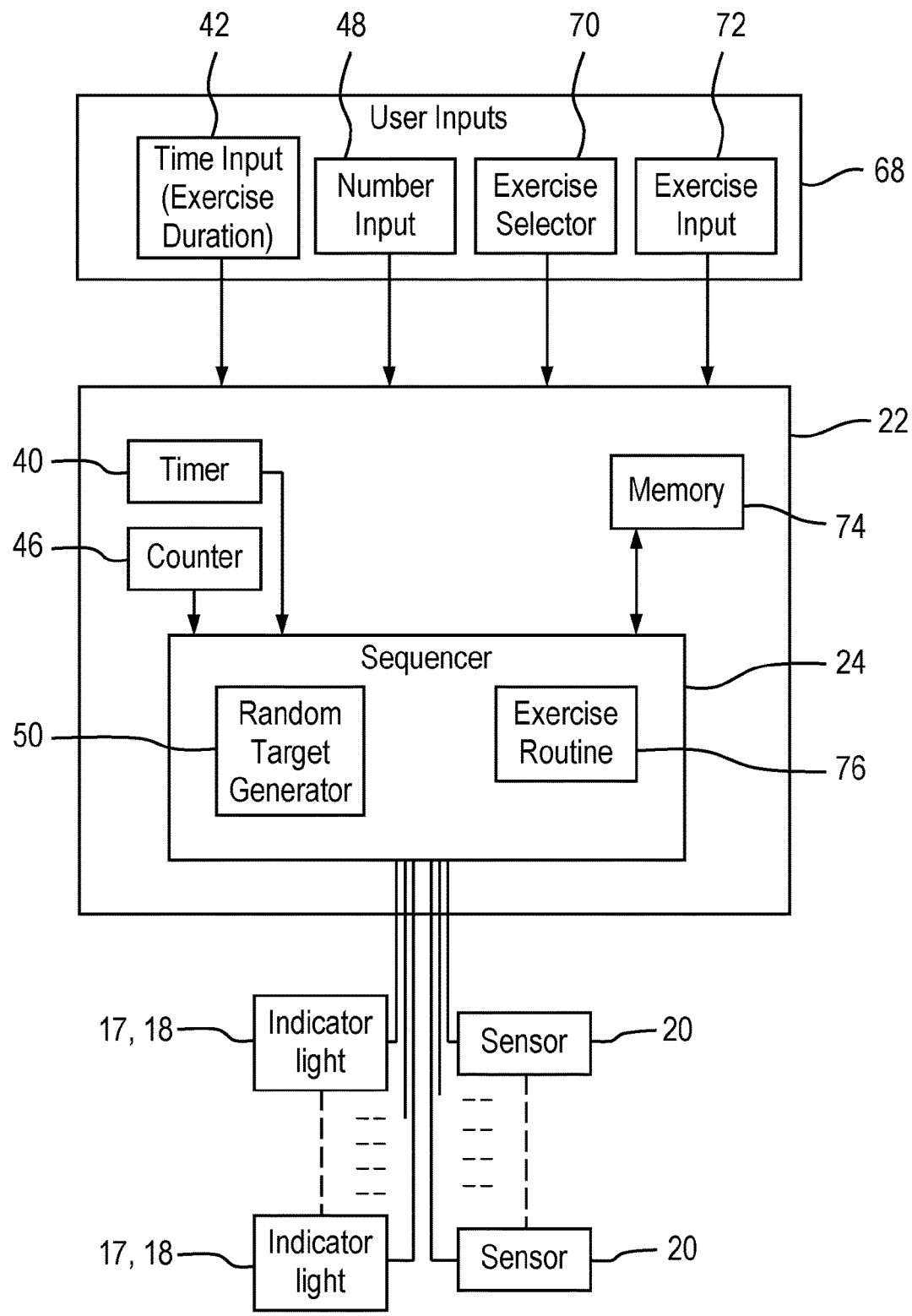
FIG. 5 is a schematic block diagram of parts of the apparatus including user inputs and a controller.

Referring to FIG. 5, the apparatus 10 includes a plurality of user inputs 68, which permits the input of variables to the controller 22 by the user. The user inputs 68 could include a time input 42, a number input 48, an exercise selector 70 and/or an exercise input 72. The user inputs 68 could be input by any suitable means, for example, by the touch sensitive screen 56.

The user inputs 68 could also include stop and start inputs (not shown) which when operated start and stop operation of the apparatus 10.

The controller 22 includes a timer 40. The time input 42 permits the user to input an exercise duration time. In use, in one configuration, the sequencer 24 operates for the exercise duration time.

The controller 22 includes a counter 46, which counts the number of target members 16 hit during an exercise session. The number input 48 permits the user to input the number of targets 14 to be successively illuminated during the exercise session. In use, in a second configuration, the sequencer 24 operates until the counter 46 reaches the number input.

The controller 22 includes a random target generator 50, which generates targets on a random basis. The generator 50 could generate targets in a random basis in use during the first or second configurations.

The sequencer 24 is programmable, to permit the user to input a predetermined sequence of targets 14 via the exercise input 72. The predetermined sequence of targets could comprise an exercise routine 76, which could be saved in memory 74. The controller 22 could include a plurality of exercise routines 76, which could be selectable via the exercise selector 70.

The exercise selector 70 could permit selection of the first configuration, the second configuration and/or a third configuration comprising the or one of the exercise routines 76.

In one embodiment, the apparatus 10 could provide only one of the exercise configurations.

In another embodiment, the apparatus could provide another configuration in which the user simply starts and stops the apparatus 10.

In use, the user stands on the user location marking 30 on the centre point axis 28 on the base member 32, and selects the or one of the exercise configurations described above. The sequencer 24 illuminates one of the indicator lights 18 of one of the targets 14, and the user taps or kicks the appropriate target member 16. The respective sensor 20 senses the tap or kick, whereupon the sequencer 24 extinguishes the one indicator light 18 and illuminates the indicator light 18 of the next target 14 in the exercise routine 76 or as generated by the random target generator 50.

The exercise session continues until the user stops the operation of the apparatus 10, or until the exercise routine has been completed, or the number of targets 14 hit equals the number input 48, or the exercise duration time equals the time input 42.

The controller 22 could include a recorder (not shown) which records details of the exercise session completed, such as total time duration, number of targets correctly hit, etc.

Advantageously, exercise routines 76 could be designed bespoke for a player, to improve specific aspects of that player's skill and/or fitness. For example, a routine 76 could be designed with a higher proportion of higher targets to improve off ground ball awareness, agility and balance. In another example, a routine 76 could be designed with a high degree of switching between left and right side to improve agility and balance. In another example, a routine 76 could be designed with a relatively high proportion of targets on the left side of the player to improve left foot skills.

The controller 22 could include standard exercise routines 76, which advantageously permit comparisons of player performance on a standardised basis.

The controller 22 could include veto combinations which would veto certain combinations of targets 14 which might be difficult for certain players eg players recovering from certain injuries, to prevent over reaching, or certain twisting motions.

It is an important feature of the invention that each target 14 comprises only half of the respective target assembly 12, forcing the player to hit the correct half of the target assembly 12. This ensures that muscles in the lower leg and foot of the player are exercised as the player's foot has to wrap around the target assembly 12 in a specific direction.

The assembly 10 could include one or more audible indicators (not shown) which indicate when a target 14 has been incorrectly struck.

The applicant has found that use of the apparatus 10 improves a player's eye/foot coordination and balance, while exercising all the muscles required for quicker foot speed. Exercises can be tailored for specific players and to develop specific skills, e.g. to improve coordination and control of a non-dominant foot. The apparatus can be used in rehabilitation of players after injury.

Figure 6:
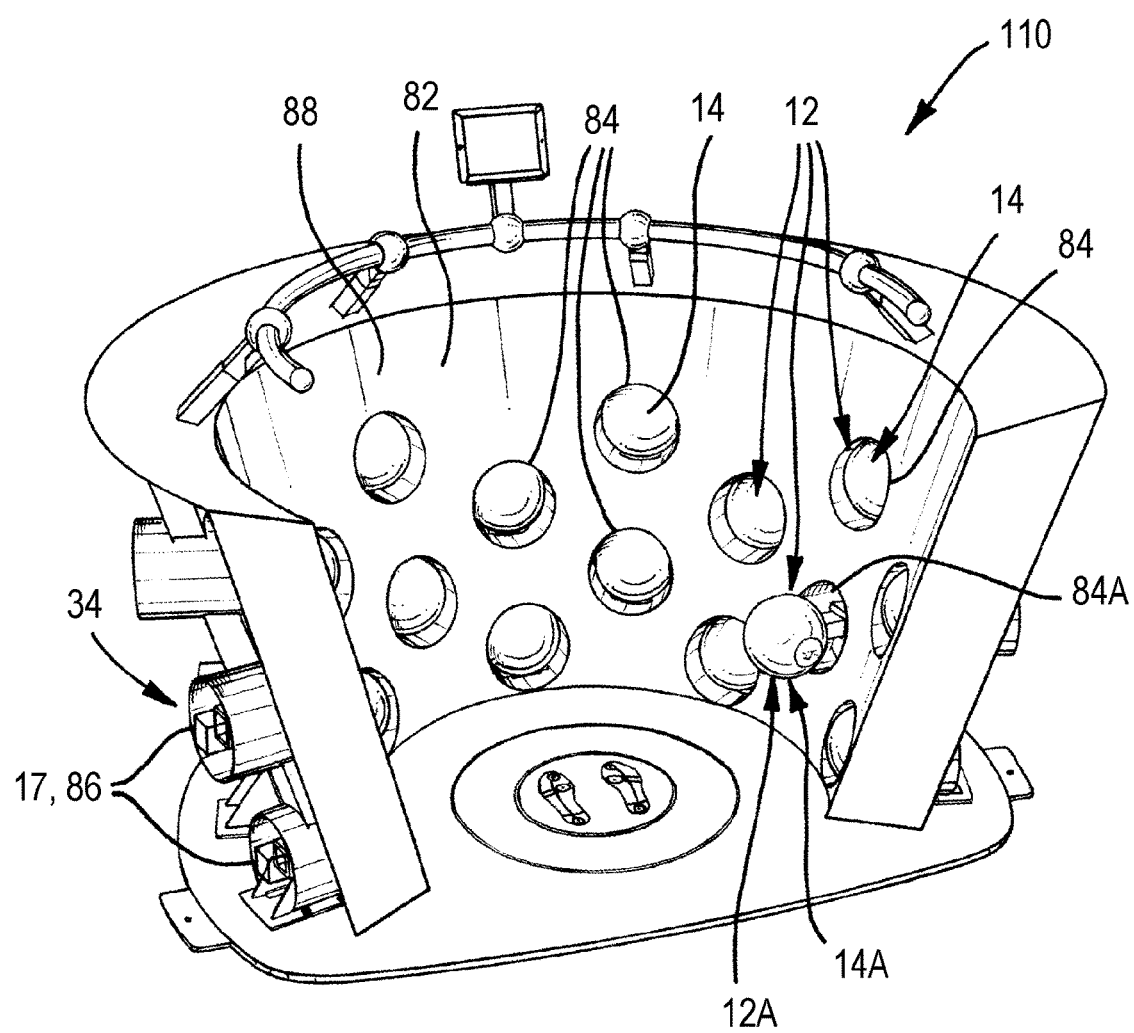
FIG. 6 is a perspective view of another sport training apparatus.

FIG. 6 shows another embodiment of the invention, many features of which are similar to those already described in relation to the embodiment of FIGS. 1 to 5. Therefore, for the sake of brevity, the following embodiment will only be described in so far as it differs from the embodiment already described. Where features are the same or similar, the same reference numerals have been used and the features will not be described again.

FIG. 6 shows another sport training apparatus 110, which includes a wall 82 having an inner surface 88. The wall 82 defines a plurality of openings 84, in each of which, one of the target assemblies 12 is located in an initial condition.

In the initial condition, each target assembly 12 locates in the opening 84 so that each target assembly 12 is substantially wholly within the opening 84 and does not protrude beyond the inner surface 88.

The wall 82 thus accommodates the target assemblies 12 in the initial conditions. The inner surface 88 slopes inwardly downwardly and curves around, following the arrangement of the rows 26. The wall 82 could be formed of a relatively soft, resiliently deformable material, such as a high density foam plastics material or a foam rubber.

Each target mounting 34 is arranged to permit (in this embodiment) substantially horizontal movement of the respective target assembly 12 from the initial, retracted condition to an extended condition, and includes an actuator 86 which actuates the movement, after receipt of a signal from the controller 22. Each actuator 86 comprises the respective alert device 17.

Each target assembly 12 is moveable by the respective actuator 86 between the retracted condition, in which the respective target assembly 12 is located in the opening 84, and an extended condition, in which the respective target assembly 12 is located out of the opening 84.

FIG. 6 shows one of the target assemblies 12A in the extended condition. In this condition, the target assembly 12A is substantially wholly protruding out of the wall 82 beyond the inner surface 88 and the opening 84A so that the target 14A is fully clear of the opening 84A.

In use, in an initial condition, the target assemblies 12 are retracted into the openings 84. During exercise, the sequencer 24 provides a signal to one of the actuators 86 to move one of the target assemblies 12 to the extended condition and then illuminates one of the indicator lights 18 of one of the targets 14 of the respective target assembly 12. The user taps or kicks the illuminated target member 16. The respective sensor 20 senses the tap or kick, whereupon the sequencer 24 extinguishes the one indicator light 18 and provides a signal to the respective actuator 86 to move the respective target assembly 12 from the extended condition back to the retracted condition. The sequencer 24 then provides a signal to another of the actuators 86 to move another of the target assemblies 12 to the extended condition and illuminates one of the indicator lights 18 of one of the targets 14 of the respective target assembly 12, and so on, in accordance with the exercise routine 76 or as generated by the random target generator 50.

This arrangement provides a number of advantages over the previous embodiment. The target assemblies 12 move towards the player for added realism, but must still be struck on a specific side or location. In the initial condition, the target assemblies 12 are recessed within the wall 82. Only the target assembly 12 to be struck moves clear of the wall 82. There is thus less risk of a player accidentally striking the wrong ball and suffering an injury. In the event that during the exercise session the player stumbled or fell over, there would also be less risk of injury.

The speed of movement of the target assemblies 12 and the timing between movements could be varied and could be variable within an exercise session or routine.

In one example, the wall 82 could be the wall of a room or cubicle.

In one example, each actuator 86 could solely comprise the respective alert device 17, which does not include an indicator light 18.

In other embodiments (not shown), the target assemblies 12 could move in different directions.

Various other modifications could be made without departing from the scope of the invention. The sport training apparatus of the invention and the component parts thereof could be of any suitable number, size, and arrangement, and could be formed of any suitable material, and could be used for any suitable purpose. For example, the apparatus could comprise different shaped target assemblies, at different heights for different sports. The number of target assemblies could be different. The target assemblies could include any suitable number of targets, which could be arranged differently. For example, some or all of the targets could be arranged vertically in the target assemblies.

In one example, each target assembly could rotate about the axis of the respective target arm member.

There is thus provided sport training apparatus which provides consistent and repeatable exercise routines, which permit skill level and development to be measured and compared. Exercise routines can be tailored to provide specific skill and fitness development. The apparatus reflects real game situations in that the sequence can be randomised. The apparatus permits the user to exercise or develop such skills as reaction time, ball awareness, agility and foot speed.

What I claim is:

1. A soccer training apparatus for improving the foot speed and skill of a user comprising:
    a plurality of spherical target assemblies approximately the size of a standard soccer ball, each spherical target assembly including at least two targets arranged side by side horizontally, each target including a target member adapted to be tapped or kicked by the user, an alert device and a sensor; and
    a controller in signal communication with the alert devices and the sensors, the controller including a sequencer which controls the sequence in which the alert devices are activated, the apparatus being arranged so that in use, one of the alert devices is activated until the sensor detects that the target member has been hit, whereupon the sequencer will deactivate the one of the alert devices and activate another of the alert devices.

2. The apparatus according to claim 1, wherein each target member forms a hemispherical portion of said spherical target assembly.

3. The apparatus according to claim 2, in which each target member is formed of a material selected from the group consisting of: a resiliently deformable material, a high density foam plastics material, and a foam rubber material.

4. The apparatus according to claim 1, in which the target assemblies are arranged in one of the following layouts:
    target assemblies arranged in one or more rows;
    target assemblies arranged in two or more rows that are equispaced vertically;
    target assemblies arranged in two or more rows that are equispaced horizontally;
    target assemblies arranged in two or more rows set at different heights from the ground;

target assemblies arranged in two or more rows in which the target assemblies on one row are offset from the target assemblies in one or both adjacent rows;

target assemblies arranged in two or more rows in which the target assemblies on one row are equally offset from the target assemblies in one or both adjacent rows;

target assemblies arranged in rows and equispaced along the rows;

target assemblies arranged in arcs;

target assemblies arranged in one or more arcs, wherein each arc is centered on a center point;

target assemblies arranged in two or more arcs, wherein each arc is centered on a center point, and the center points lie along a center point axis; and target assemblies arranged in two or more arcs, wherein each arc is centered on a center point, and the center points lie along a substantially vertical center point axis.

5. The apparatus according to claim 1, further comprising one or more mountings in which each target assembly is mounted to a mounting.

6. The apparatus according to claim 5, in which each mounting mounts a plurality of target assemblies.

7. The apparatus according to claim 5, in which each mounting comprises a mounting member.

8. The apparatus according to claim 1, in which each alert device includes an indicator light, which is illuminated when activated.

9. The apparatus according to claim 1, in which the controller includes a timer, and the apparatus includes an exercise duration time input.

10. The apparatus according to claim 9, in which the sequencer operates for the exercise duration time.

11. The apparatus according to claim 1, in which the controller includes a counter, which counts the number of target members hit during an exercise session.

12. The apparatus according to claim 1, in which the apparatus includes a number input, which permits the user to input the number of targets to be successively illuminated during the exercise session.

13. The apparatus according to claim 12, in which the sequencer operates until the counter reaches the number input.

14. The apparatus according to claim 1, in which the controller includes a random target generator, which generates the next target to be illuminated on a random basis.

15. The apparatus according to claim 1, in which the sequencer is programmable, to permit the user to input a predetermined sequence of targets.

16. The apparatus according to claim 5, in which each mounting includes an actuator for moving the respective target assembly.

17. The apparatus according to claim 16, in which the actuator comprises the alert device.

18. The apparatus according to claim 16, in which each target assembly is moved substantially horizontally.

19. The apparatus according to claim 16, in which the apparatus includes a wall, the wall defining a plurality of openings, in each of which, one of the target assemblies is located in a retracted condition.

20. The apparatus according to claim 19, in which each target assembly is moveable by the respective actuator between the retracted condition, in which the respective target assembly is located in the opening, and an extended condition, in which the respective target assembly is located out of the opening.

21. A method of soccer training for improving the foot speed and skill of a user, the method comprising the steps of:
providing sport training apparatus, the apparatus including a plurality of spherical target assemblies approximately the size of a standard soccer ball, each spherical target assembly including at least two targets arranged side by side horizontally, each target including a target member adapted to be tapped or kicked by the user, an alert device and a sensor, the apparatus including a controller in signal communication with the alert devices and the sensors, the controller including a sequencer which controls the sequence in which the alert devices are activated; and
activating one of the alert devices until the sensor detects that the respective target member has been hit and subsequently deactivating the one of the alert devices and activating another of the alert devices via the sequencer.

* * * * *